US012505070B2

(12) United States Patent
Ireifej et al.

(10) Patent No.: US 12,505,070 B2
(45) Date of Patent: *Dec. 23, 2025

(54) TRANSFORMATION AS A SERVICE

(71) Applicant: AT&T Intellectual Property I, L.P., Atlanta, GA (US)

(72) Inventors: Paul Ireifej, Matawan, NJ (US); Mohammad Omar Khalid Mirza, Plano, TX (US); Prince Paulraj, Coppell, TX (US); Heather Wighton, Flemington, NJ (US); Christopher Kim, Plano, TX (US); Stephen Grandinetti, Wall, NJ (US); Mger Babayan, Plano, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/676,675

(22) Filed: May 29, 2024

(65) Prior Publication Data

US 2024/0311340 A1    Sep. 19, 2024

Related U.S. Application Data

(63) Continuation of application No. 18/149,787, filed on Jan. 4, 2023, now Pat. No. 12,032,520, which is a
(Continued)

(51) Int. Cl.
*G06F 16/16* (2019.01)
*G06F 16/25* (2019.01)

(52) U.S. Cl.
CPC .......... *G06F 16/168* (2019.01); *G06F 16/256* (2019.01); *G06F 16/258* (2019.01)

(58) Field of Classification Search
CPC .... G06F 16/168; G06F 16/256; G06F 16/258; G06F 16/254
See application file for complete search history.

(56) References Cited

U.S. PATENT DOCUMENTS 9,542,456 B1 *   1/2017   Das ...................... G06F 11/188
10,592,472 B1    3/2020   Jarasius et al.
(Continued)

OTHER PUBLICATIONS

Opentext, "Data Transformation Tools", https://business.opentext.com/data-transformation-tools/, 6 pages, accessed on Feb. 22, 2021.
(Continued)

*Primary Examiner* — Dangelino N Gortayo
(74) *Attorney, Agent, or Firm* — Guntin & Gust, PLC; Daniel P. Williams

(57) ABSTRACT

Aspects of the subject disclosure may include, for example, receiving input data via a transformation UI, generating transformation configuration data, causing the transformation UI to present transformation object data per the transformation configuration data, where the transformation object data identifies data objects each including an input and output field name and a data type, detecting, from the transformation UI, an instruction defining a mapping for the input data, including a modification to the output field name of a data object such that the input field name of the data object is mapped to the modified output field name, based on the detecting the instruction, modifying the first transformation configuration data per the mapping to derive second transformation configuration data, performing a transformation of the input data based on the second transformation configuration data, and causing the transformation UI to present a transformation output. Other embodiments are disclosed.

20 Claims, 12 Drawing Sheets

Related U.S. Application Data continuation of application No. 17/220,260, filed on Apr. 1, 2021, now Pat. No. 11,561,933.

(56) References Cited

U.S. PATENT DOCUMENTS

| | | | |
|---|---|---|---|
| 11,243,969 B1* | 2/2022 | Sayre | G06F 16/285 |
| 11,373,257 B1* | 6/2022 | Guo | G06N 20/00 |
| 2014/0040182 A1* | 2/2014 | Gilder | G06F 16/256 |
| | | | 707/602 |
| 2016/0179481 A1 | 6/2016 | Ohara | |
| 2019/0079996 A1 | 3/2019 | Mochel et al. | |
| 2019/0197174 A1 | 6/2019 | Kim et al. | |
| 2019/0391986 A1 | 12/2019 | Yazicioglu et al. | |
| 2020/0081899 A1 | 3/2020 | Shapur et al. | |
| 2020/0184100 A1* | 6/2020 | Ong | G06F 16/1824 |
| 2020/0233877 A1 | 7/2020 | Patel et al. | |
| 2020/0334269 A1 | 10/2020 | Chowdhury et al. | |
| 2021/0011924 A1 | 1/2021 | Turner | |
| 2021/0200744 A1 | 7/2021 | Gubba et al. | |
| 2022/0318194 A1 | 10/2022 | Ireifej et al. | |
| 2023/0143392 A1 | 5/2023 | Ireifej et al. | |

OTHER PUBLICATIONS

Oracle, "Contivo Transformation", Oracle Fusion Middleware, Part 16. Conversion Filters, 2 pages, accessed on Feb. 22, 2021.
Oracle, "Multipart Bodypart Conversion", Oracle Fusion Middleware Part 16. Conversion Files, accessed on Feb. 22, 2021, 2 pages.

* cited by examiner

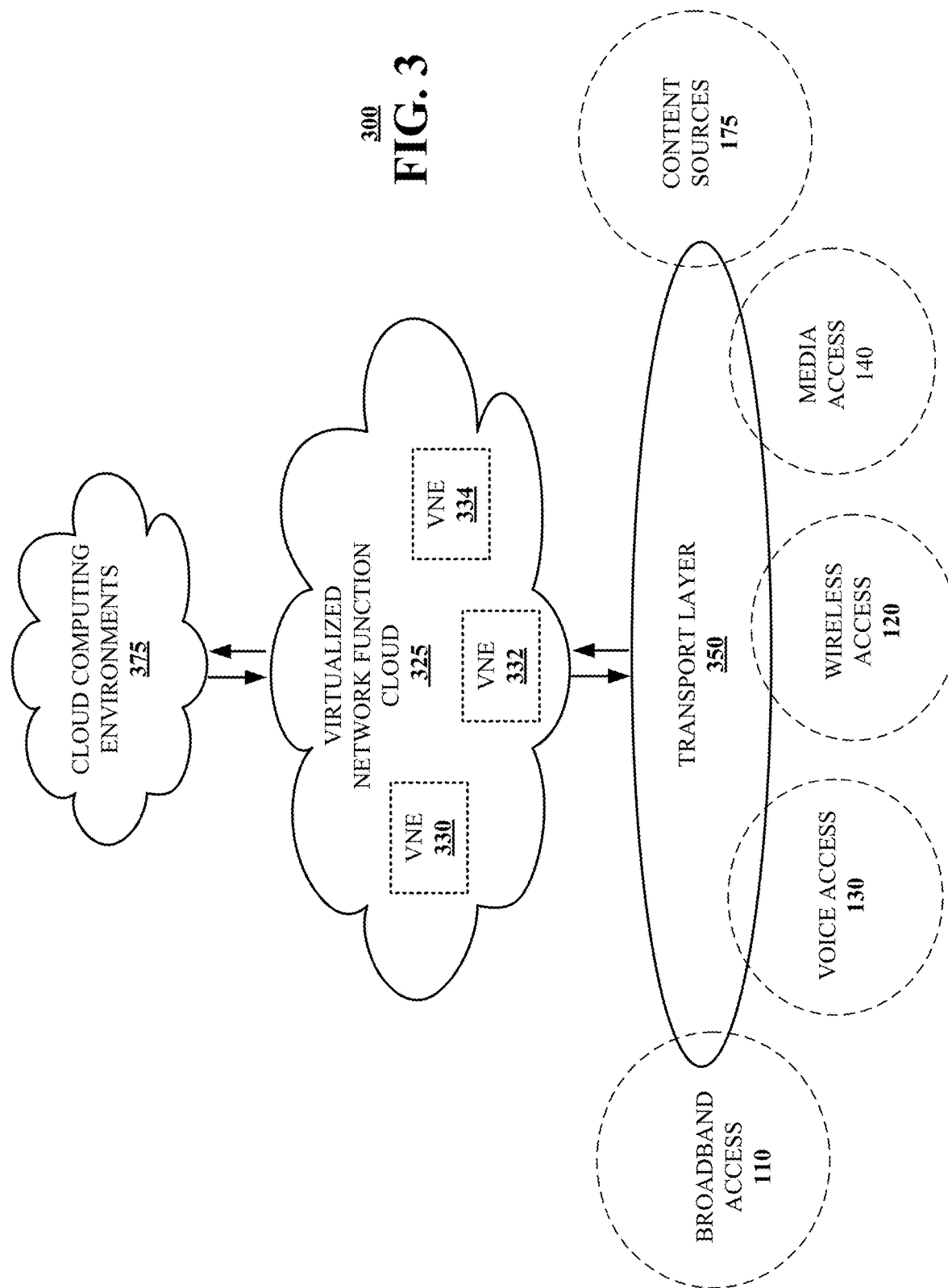

TRANSFORMATION AS A SERVICE

CROSS-REFERENCE TO RELATED APPLICATIONS

This application is a continuation of and claims priority to U.S. application Ser. No. 18/149,787, filed Jan. 4, 2023, which is a continuation of U.S. application Ser. No. 17/220,260, filed Apr. 1, 2021 (now U.S. Pat. No. 11,561,933). The contents of each of the foregoing application(s) and/or patent(s) are hereby incorporated by reference into this application as if set forth herein in full.

FIELD OF THE DISCLOSURE

The subject disclosure relates to transformation as a service.

BACKGROUND

The complexity of data communications (e.g., business-related communications or the like) continues to evolve as new technologies are developed.

BRIEF DESCRIPTION OF THE DRAWINGS

Reference will now be made to the accompanying drawings, which are not necessarily drawn to scale, and wherein:

FIGS. 2B-2F are diagrams illustrating example, non-limiting embodiments of a transformation user interface (UI) functioning in, or in conjunction with, the communications network of FIG. 1 and/or the system of FIG. 2A in accordance with various aspects described herein.

FIG. 3 is a block diagram illustrating an example, non-limiting embodiment of a virtualized communications network in accordance with various aspects described herein.

DETAILED DESCRIPTION

Figure 1:
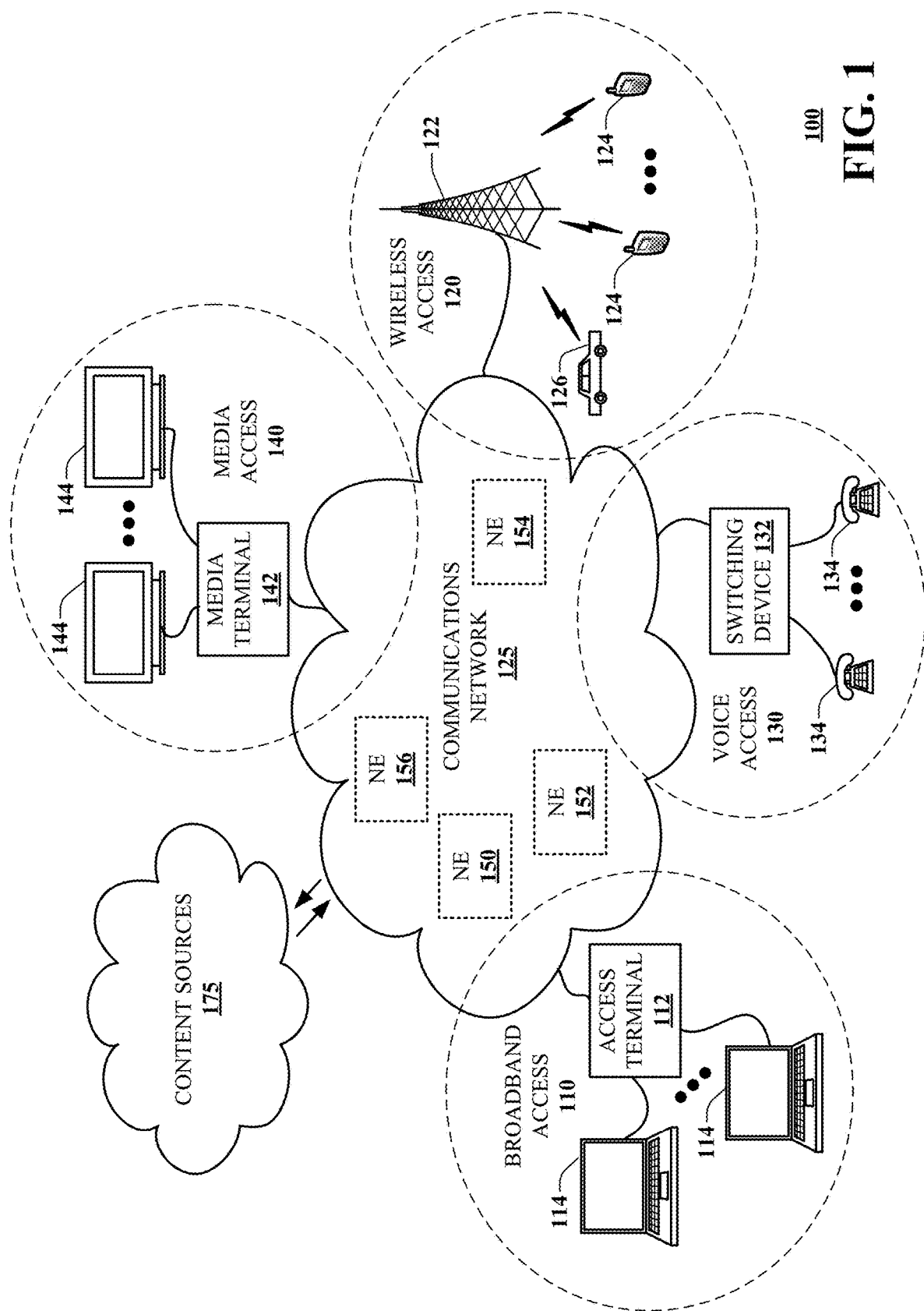
FIG. 1 is a block diagram illustrating an exemplary, non-limiting embodiment of a communications network in accordance with various aspects described herein.

As new technologies continue to be developed, and the need to communicate a variety of data types increases, organizations are finding it more and more challenging to manage the overall flow of data across different systems. Typically, enabling data to flow from one system to another may involve a manual process where a schema is defined for facilitating that flow of data, and code is developed for at a target system to implement that schema. This can be time-intensive, costly, and error-prone, and especially so if a change needs to be made to a format of the data (e.g., to field(s) of the data) at some point upstream, since this may require the schema to be redefined and tested, and the code at the target system to be overhauled and debugged.

The subject disclosure describes, among other things, illustrative embodiments for providing dynamic, flexible transformation (or normalization) of data, and facilitating communication of transformed data across systems. In exemplary embodiments, a transformation platform may be implemented to provide "transformation as a service." The transformation platform may be capable of performing transformations of input data (e.g., messages or the like), and may include or provide a transformation user interface (UI) (e.g., a self-service engine or tool) that can be used to drive functionality of the transformation platform. Input data may be provided by a user and/or obtained from one or more source data feeds, and may be in a variety of formats, including, for example, JavaScript Object Notation (JSON), extensible Markup Language (XML), comma-separated value (CSV), flat-file format, and/or the like.

In various embodiments, the transformation UI may enable a user to control, or otherwise interact with, the transformation platform, such as by identifying input data (e.g., including any source data feed(s) from one or more sources) to be transformed, defining a target output data format (e.g., by defining key value pair mappings, data types, etc.), and viewing, in real-time (or near real-time), transformation outputs produced by the transformation platform.

Embodiments of the transformation platform may enable communication connections to be established with various types of services, topics, hosts, or the like to obtain input data and/or to distribute transformation outputs to target systems (e.g., target servers, applications, cloud environments, and/or the like). Examples of source/target systems or types of connections may include Kafka® connections, Event Hub, Redis, application programming interfaces (APIs), and/or the like. In various embodiments, the transformation platform may provide an API (e.g., a Representational State Transfer (REST) or REST-like interface) via which the transformation UI may communicate with the transformation platform.

In exemplary embodiments, the transformation platform may be capable of facilitating rule-based data injection and complex data enrichment. For example, in various embodiments, the transformation platform may enable a user to define, via the transformation UI, regular expressions (e.g., relating to data labelling (e.g., categorization values), calculations, address normalizations, name standardization, and/or the like) to create new data fields (referred to herein as virtual fields) for a transformation output, and may dynamically generate new datapoints accordingly in real-time (or near real-time). In some embodiments, the transformation platform may be capable of merging multiple source data feeds, from a variety of sources, into a single transformation output. In certain embodiments, the transformation platform may enable transformation of a date for a data object from one date format to another.

Providing a reusable, "plug and play" transformation platform, including a transformation UI that enables a user to configure and visualize transformation outputs in real-time (or near real-time), as described herein, simplifies the intercommunication and use of data across different systems, which reduces project complexity, lead times, and costs. Providing the capability to define, via the transformation UI, virtual fields (that, for example, do not exist in input data) also enables flexible data injection in, or customization of, transformation outputs.

One or more aspects of the subject disclosure include a device, comprising a processing system including a processor, and a memory that stores executable instructions that, when executed by the processing system, facilitate performance of operations. The operations can include receiving, via a transformation user interface (UI), input data or information regarding the input data, generating first transformation configuration data based on the input data, and causing the transformation UI to present transformation object data in accordance with the first transformation configuration data, wherein the transformation object data identifies a plurality of data objects corresponding to the input data, wherein each data object of the plurality of data objects includes a respective input field name, a respective output field name, and a respective data type. Further, the operations can include detecting, from the transformation UI, a first user instruction that defines a first mapping for the input data, wherein the first user instruction comprises a modification to the respective output field name of a first data object of the plurality of data objects, resulting in a modified output field name, such that the respective input field name of the first data object is mapped to the modified output field name. Further, the operations can include, based on the detecting the first user instruction, modifying the first transformation configuration data in accordance with the first mapping to derive second transformation configuration data. Further, the operations can include performing a transformation of the input data based on the second transformation configuration data to derive a transformation output, and responsive to the performing the transformation, causing the transformation UI to present the transformation output.

One or more aspects of the subject disclosure include a non-transitory machine-readable medium, comprising executable instructions that, when executed by a processing system including a processor, facilitate performance of operations. The operations can include obtaining input data from a transformation user interface (UI), deriving transformation configuration data based on the input data, and causing the transformation UI to present transformation object data in accordance with the transformation configuration data, wherein the transformation object data identifies a data object corresponding to the input data, and wherein the data object includes an input field name, an output field name, and a data type. Further, the operations can include receiving, via the transformation UI, an instruction to define a first mapping to be used for transforming the input data, wherein the first mapping relates to a change to the output field name of the data object. Further, the operations can include, responsive to receiving the instruction, updating the transformation configuration data based on the first mapping to produce updated transformation configuration data, performing a transformation of the input data based on the updated transformation configuration data, resulting in a transformation output, and responsive to the performing the transformation, providing the transformation output to a target system.

One or more aspects of the subject disclosure include a method. The method can comprise obtaining, by a processing system including a processor, a plurality of source data feeds over a network, generating, by the processing system, first transformation configuration data based on the plurality of source data feeds, and causing, by the processing system, a transformation user interface (UI) to present transformation object data in accordance with the first transformation configuration data, wherein the transformation object data identifies a first data object corresponding to a first source data feed of the plurality of source data feeds, and a second data object corresponding to a second source data feed of the plurality of source data feeds, and wherein the first data object includes a first input field name, and wherein the second data object includes a second input field name. Further, the method can include receiving, by the processing system and from the transformation UI, a user instruction that defines a particular output field name based on the first input field name and the second input field name, modifying, by the processing system, the first transformation configuration data based on the user instruction to derive second transformation configuration data, and performing, by the processing system, a transformation of the plurality of source data feeds based on the second transformation configuration data to produce a transformation output. Further, the method can include causing, by the processing system, the transformation UI to present the transformation output.

Other embodiments are described in the subject disclosure.

Referring now to FIG. 1, a block diagram is shown illustrating an example, non-limiting embodiment of a system 100 in accordance with various aspects described herein. For example, system 100 can facilitate, in whole or in part, defining of transformation configuration data and providing of real-time (or near real-time) transformation of input data/source data feed(s) based on the transformation configuration data. In particular, a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communications network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc. for facilitating the broadband access 110, wireless access 120, voice access 130, media access 140 and/or the distribution of content from content sources 175. The communications network 125 can include a circuit switched or packet switched network, a voice over Internet protocol (VOIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or other communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VOIP gateway or other gateway device and/or other switching device. The telephony devices 134 can include traditional telephones (with or without a terminal adapter), VOIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

Figure 2A:
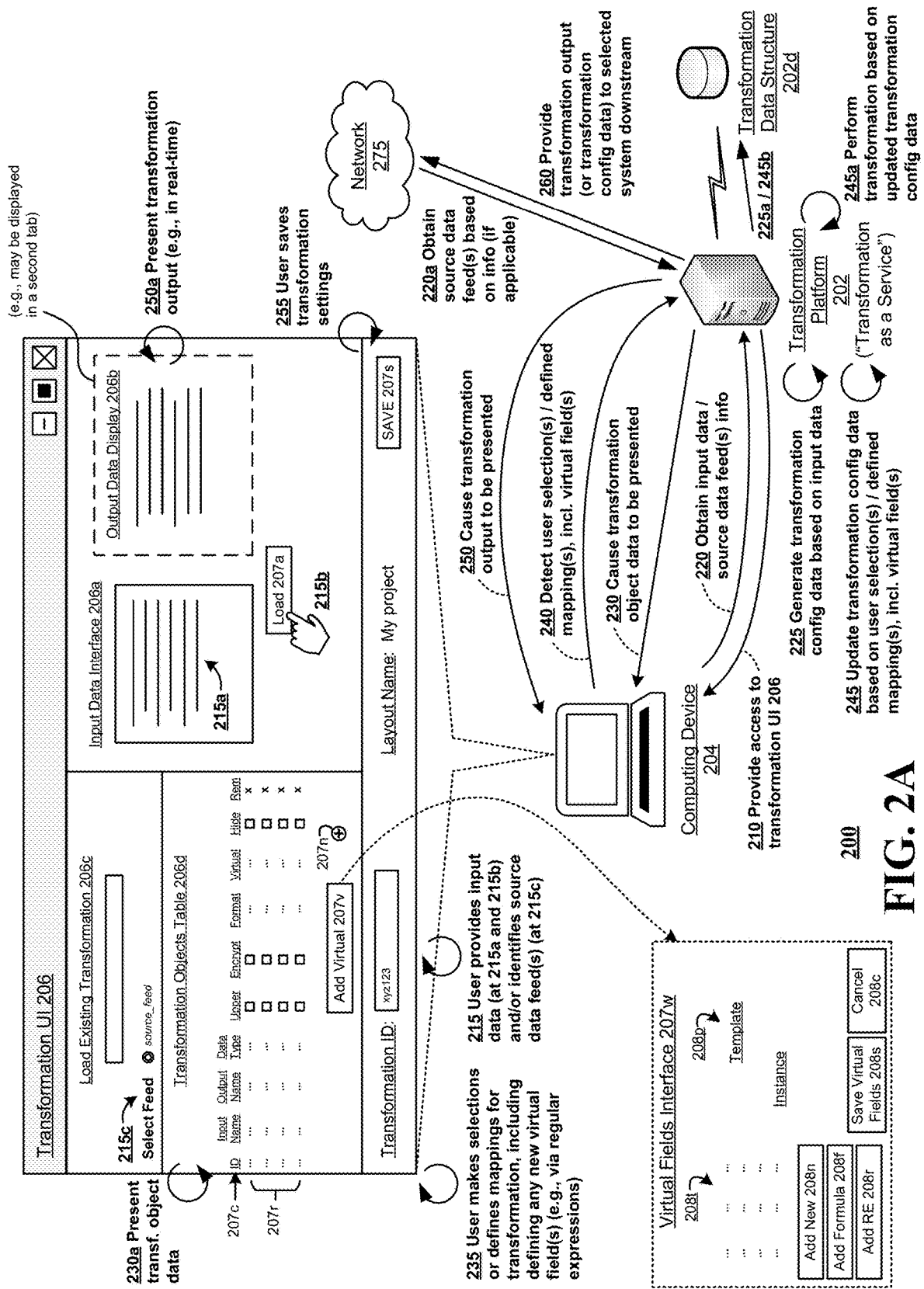
FIG. 2A is a block diagram illustrating an example, non-limiting embodiment of a system functioning within the communications network of FIG. 1 in accordance with various aspects described herein.

FIG. 2A is a block diagram illustrating an example, non-limiting embodiment of a system 200 functioning within, or operatively overlaid upon, the communications network of FIG. 1 in accordance with various aspects described herein. In various embodiments, the system 200 can facilitate, via a transformation platform and a transformation UI, defining of transformation configuration data and providing of real-time (or near real-time) transformation of input data/source data feed(s) based on the transformation configuration data.

As shown in FIG. 2A, the system 200 may include a transformation platform 202. In various embodiments, the transformation platform 202 may include one or more devices (e.g., server device(s) or the like) configured to provide one or more functions or capabilities relating to transformation of data. In exemplary embodiments, the transformation platform 202 may be capable of facilitating transformation of input data (including source data feed(s) or the like) by, for example, providing a transformation UI 206, obtaining, via the transformation UI 206, user instructions regarding input data to be transformed, generating transformation configuration data based on the input data, causing transformation object data (corresponding to the transformation configuration data) to be presented on the transformation UI 206, detecting, via the transformation UI 206, user instructions that define mappings for the transformation, updating the transformation configuration data based on the defined mappings, performing the transformation based on the updated transformation configuration data to derive a transformation output, and/or causing the transformation output to be presented on the transformation UI 206. In various embodiments, the transformation platform 202 may be capable of providing the transformation output and/or the updated transformation configuration data to one or more target (e.g., downstream) systems.

As shown in FIG. 2A, the transformation platform 202 may be communicatively coupled to a transformation data structure 202*d*. In certain embodiments, the transformation data structure 202*d* may be included in the transformation platform 202. The transformation data structure 202*d* may be implemented in a database, a table, a trie, a linked list, an array, and/or the like, and may be configured to store transformation configuration data and/or transformation outputs.

As shown in FIG. 2A, the transformation platform 202 may be communicatively coupled to a network 275 and a computing device 204. The network 275 may include one or more wired and/or wireless networks. For example, the network 275 may include a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or the like, and/or a combination of these or other types of networks.

The computing device 204 may include one or more devices capable of receiving, generating, storing, processing, and/or providing data, including data relating to the transformation platform 202 and/or the transformation UI 206. For example, the computing device 204 can include a communication and/or computing device, such as a mobile phone (e.g., a smart phone, a radiotelephone, etc.), a desktop computer, a laptop computer, a tablet computer, a handheld computer, a gaming device, a wearable communication device (e.g., a smart wristwatch, a pair of smart eyeglasses, etc.), or a similar type of device. Although not shown, in some embodiments, the transformation platform 202 may be communicatively coupled to the computing device 204 via the network 275.

It will be appreciated and understood that the system 200 can include any number of transformation platforms, transformation UIs, transformation data structures, networks, and computing devices, and thus the number of transformation platforms, transformation UIs, transformation data structures, networks, and computing devices shown in FIG. 2A is for illustrative purposes only.

The transformation UI 206 may include a graphical user interface, a non-graphical user interface, a text-based user interface, and/or the like. In various embodiments, the transformation UI 206 may provide information for display. In some embodiments, a user may interact with the information, such as by providing input via an input component of the computing device 204 that provides the transformation UI 206 for display. In certain embodiments, the transformation UI 206 may be configurable by the computing device 204 and/or by a user (e.g., a user may change the size of the transformation UI 206, information provided via the transformation UI 206, a position of information provided via the transformation UI 206, etc.). Additionally, or alternatively, the transformation UI 206 may be pre-configured to a standard configuration, a specific configuration based on a type of device on which the transformation UI 206 is displayed, and/or a set of configurations based on capabilities and/or specifications associated with a device on which the transformation UI 206 is displayed.

As shown in FIG. 2A, the transformation UI 206 may include an input data interface 206*a*, an output data display 206*b*, a load transformation interface (e.g., a load existing transformation interface 206*c*), and a transformation objects table 206*d*. In various embodiments, the input data interface 206*a* may include an input text box or the like, and may allow a user to provide (e.g., via manual entry, copy/paste, or the like) input data (e.g., JSON text or the like) to be transformed by the transformation platform 202. The output data display 206*b* may present a transformation output—e.g., a preview of the transformation output or the like. In various embodiments, the input data interface 206*a* and the output data display 206*b* may be implemented in different tabs. In some embodiments, the output data display 206*b* may be accessible, or visible, when (e.g., only when) a transformation output is available. In certain embodiments, the output data display 206*b* may be read-only.

In various embodiments, the transformation UI 206 may allow a user to identify, via the load transformation interface 206*c*, source data feed(s) to be submitted to the transformation platform 202 for transformation. The load transformation interface 206*c* may enable a user to select (e.g., via a select feed option 215*c*) one or more service/feed name combinations (e.g., existing service/feed name combination(s)) to load source data feed(s) or transformation object(s) (e.g., existing transformation object(s)) to the transformation platform 202. In some embodiments, the transformation platform 202 and/or the transformation UI 206 may utilize, or connect to, a service (e.g., AiOneOps or the like) that identifies source data feed(s) and corresponding service/feed names, and may present user selectable service/feed names based on information provided by the service. Embodiments of the transformation platform 202 may enable connections to numerous types of services, topics, hosts, or the like to obtain input data from sources and/or distribute transformed data to targets (e.g., servers, applications, cloud environments, and/or the like). Examples of source/target systems or types of connections may include Kafka® connections, Event Hub, Redis, APIs, and/or the like. In various embodiments, the transformation platform 202 may provide a REST or REST-like API that enables the transformation UI 206 and the transformation platform 202 to communicate with one another.

In various embodiments, and as described in more detail below, the transformation objects table 206*d* may provide a user-adjustable representation (e.g., a flattened representation, such as where key value pairs are presented without any nesting) of the input data provided by a user or obtained from user-identified source data feed(s).

It will be appreciated and understood that, while the input data interface 206*a*, the output data display 206*b*, the load transformation interface 206*c*, and the transformation objects table 206*d* are shown as being arranged in a particular layout in the transformation UI 206, the various interfaces/displays may be arranged in any suitable manner in the transformation UI 206.

As briefly described above, functionality of the transformation platform 202 may be driven based upon user interaction with the transformation UI 206. As shown by reference number 210, the transformation platform 202 may provide the computing device 204 with access to the transformation UI 206. In various embodiments, and as depicted in FIG. 2A, the computing device 204 may present (e.g., display) the transformation UI 206. In some embodiments, the transformation platform 202 may provide the transformation UI 206 to (e.g., only to) authorized users. For example, the transformation platform 202 may require a user to provide authentication credentials, or otherwise be associated with select permissions (e.g., permissions granted by an administrator, an organization, and/or the like), in order to access the transformation UI 206. In certain embodiments, the transformation platform 202 may provide a workspace for individual users or groups of users (e.g., with shared access and/or different levels of access or the like). A workspace may enable users to define or configure transformation settings, transformation layouts, and/or the like.

As shown by reference number 215, the transformation UI 206 may receive input data to be transformed and/or an identification (or selection) of source data feed(s) containing input data to be transformed. For instance, a user may provide (e.g., via manual entry, copy/paste, or the like) input data (e.g., JSON text or the like) to the input data interface 206*a* (reference number 215*a*) and select the load option 207*a* (reference number 215*b*) to submit the input data to the transformation platform 202. In various embodiments, the transformation platform 202 may process the input data and check for validity thereof, in real-time (or near real-time, such as within a threshold time period that is determined to be sufficient for a validation time period), as the input data is being provided (e.g., while input data is being entered or typed by a user in the input data interface 206*a*). In some embodiments, the transformation platform 202 may, based upon determining that input data is invalid (e.g., has incorrect syntax, is in an improper format or is malformed, or the like), cause the transformation UI 206 to provide real-time (or near real-time) feedback to the user. For example, in a case where the input data is invalid, the transformation platform 202 may cause the transformation UI 206 to provide a notification to the user—e.g., visually, such by adjusting a color of a border of the input data interface 206*a* (e.g., to red), presenting an error message (e.g., adjacent to the load option 207*a*), and/or the like; audibly, such as by outputting a tone or the like; haptically, such as by causing a device to vibrate or the like; etc. Continuing the example, in certain embodiments, the transformation platform 202 may additionally, or alternatively, cause the transformation UI 206 to prevent user selection of the load option 207*a* (e.g., by graying out the load option 207*a* or the like).

As an alternative to providing input data via the input data interface 206*a*, a user may identify input data by selecting, via the load transformation interface 206*c* (e.g., via the select feed option 215*c*), one or more service/feed name combinations to load one or more source data feeds or transformation objects (e.g., existing transformation objects) to the transformation platform 202. In some embodiments, the transformation UI 206 may, based upon user selection of the service name and/or feed name, present an expandable/collapsible tree structure in which a node (e.g., each node) in the tree structure may represent a respective service name and a leaf node (e.g., each leaf node) may represent a respective feed name belonging to the expanded service name node. User selection of a leaf node may cause the transformation platform 202 to identify, or select, the service/feed name combination, generate a value (e.g., a string, such as a string "service.feed" or the like), and cause the transformation UI 206 to present the value as a user-selectable element.

As shown by reference number 220, the transformation platform 202 may receive the input data and/or information regarding source data feed(s). In a case where the user provides input data via the input data interface 206*a* and selects the load 207*a* option, the transformation platform 202 may receive the input data based upon the user selection of the load 207a option. In a case where the user provides information regarding source data feed(s) (e.g., by choosing the above-described service/feed name combination and selecting the above-described user-selectable value (e.g., string, such as "service.feed" or the like)), the transformation platform 202 may obtain the source data feed(s) based on the received information. In this case, and as shown by reference number 220a, the transformation platform 202 may access one or more external server devices over the network 275 to obtain the source data feed(s).

As shown by reference number 225, the transformation platform 202 may generate transformation configuration data based on the input data. In various embodiments, the transformation platform 202 may generate transformation configuration data by identifying data objects from the input data, identifying respective input field names for the data objects, determining respective output field names (which may, at this stage, be the same as corresponding input field names) for the data objects, determining respective data types (e.g., temporary data types) for the data objects, and/or the like. As shown by reference number 225a, the transformation platform 202 may store the transformation configuration data in the transformation data structure 202d.

In some instances, a user may predetermine how input data is to be transformed, and manually format the input data to include particular mappings of input field names and output field names accordingly, at the outset. In such cases, the user may provide the formatted input data (e.g., via the input data interface 206a), and the transformation platform 202 may, based upon receiving such formatted input data, generate transformation configuration data according to the particular mappings.

As shown by reference number 230, the transformation platform 202 may cause transformation object data to be presented on the transformation UI 206. In various embodiments, the transformation object data may correspond to the generated transformation configuration data. As shown by reference number 230a, the transformation platform 202 may cause the transformation UI 206 to populate the transformation objects table 206d with a transformation object based on the transformation configuration data—e.g., where the input data may be flattened into unique keys, and where a row (e.g., each row) of the transformation objects table 206d may represent a respective data object (e.g., which may be referred to as an "App Field Type" object or the like). In various embodiments, the transformation objects table 206d may provide user selectable options for configuring, or otherwise define mappings for, the transformation. For example, the transformation objects table 206d may provide user selectable options (e.g., in the form of drop-down selections, manual text-based entry fields, and/or the like) to select or define, for a data object, a corresponding output (or target) name, a data type, and/or the like. Although not shown, in various embodiments, the transformation UI 206 may present feed names (e.g., all the feed names) relating to a loaded transformation object. User selection of a feed name may cause the transformation UI 206 to perform filtering of one or more of virtual fields described in more detail below.

As shown in FIG. 2A, the transformation objects table 206d may include multiple rows 207r of data objects with corresponding columns (or headings) 207c. Columns 207c may include, for example, an "ID" column, an "Input Name" column, an "Output Name" column, a "Data Type" column, an "Upper" column, an "Encrypt" column, a "Format" column, a "Virtual" column, a "Hide" column, and a "Remove" column. It is to be appreciated and understood that the transformation objects table 206d may include any number of columns or headings, a variety of columns or headings for representing data object information, and any suitable arrangement of columns or headings, and thus the columns or headings and arrangement thereof shown in FIG. 2A are provided only as examples.

An "ID" in the transformation objects table 206d may be a unique identifier for a data object. In various embodiments, the transformation platform 202 may cause the transformation UI 206 to populate an ID value in response to an existing transformation being loaded—e.g., via the load transformation interface 206c—or, additionally, or alternatively, when a new row is inputted/saved, and a valid ID value is returned.

An "Input Name" for a data object in the transformation objects table 206d may represent a flattened key obtained based upon processing (e.g., by the transformation platform 202) a manual input (e.g., a manual JSON input or the like entered into the input data interface 206a) and/or a source data feed (e.g., a JSON-based source data feed or the like) when a transformation (e.g., an existing transformation) is loaded—for example, the "Input Name" may be identified under a "fieldNameInMessage" property value or the like in an existing transformation object. In certain embodiments, a source data feed (e.g., each source data feed) may have an "Input Name."

A data object in the transformation objects table 206d may include an "Output Name," which may represent a (e.g., final) name of a transformation or resulting product of the transformation. In some embodiments, the "Output Name" of a data object may be edited in the transformation objects table 206d (e.g., via user input, such as a text-based input or the like). In certain embodiments, the transformation platform 202 may cause the transformation UI 206 to dynamically provide updated output data (or an updated transformation output), in real-time (or near real-time), based upon modifications to an "Output Name" (e.g., while a value of an "Output Name" is being modified by a user). In various embodiments, the transformation platform 202 and/or the transformation UI 206 may enable a user to create, in real-time (or near real-time), objects and/or arrays using the "Output Name." For example, in a case where a user inputs (e.g., appends) a certain character or characters, such as a period ("."), to a value of an "Output Name," the transformation UI 206 may create a structure with nested values. As another example, in a case where a user inputs (e.g., appends) a certain other character or characters, such as open and close square brackets ("[ ]"), to a value of an "Output Name," the transformation platform 202 and/or the transformation UI 206 may create an array.

Examples of "Data Type" in the transformation objects table 206d may include "INTEGER," "DOUBLE," "DATE," "STRING," "BOOLEAN," "STRINGDATE," and/or the like. In various embodiments, the transformation platform 202 may, based upon selection (e.g., user selection) of a particular data type for a data object, set the value of the data object in a transformation output to a default value in accordance with the selected data type. For example, in a case where a user selects a "STRING" data type for a particular key, the transformation platform 202 may set, or update, the value for that key to a (e.g., hardcoded) default value of "STRING."

The "Upper" column in the transformation objects table 206d may include user selectable options (e.g., toggles) for setting the case (e.g., uppercase or lowercase) of values in a transformation output. In various embodiments, the case of a value in a transformation output may be (e.g., automatically) set based on the case of the corresponding input data. Selecting (e.g., toggling) "Upper" for a data object may, for example, cause the transformation platform 202 to change the case of the value in the transformation output to uppercase or lowercase, accordingly.

The "Encrypt" column in the transformation objects table 206d may include user selectable options (e.g., toggles) for encrypting a data object. In various embodiments, selecting (e.g., toggling) "Encrypt" for a data object may cause corresponding value(s) to become encrypted in the transformation configuration data (which may, for example, be stored in the transformation data structure 202d).

In various embodiments, "Format" in the transformation objects table 206d may (e.g., may only) be enabled for certain data type(s), such as the "DATE" data type. Adjusting a "DATE" value for a data object, for example, may cause the transformation platform 202 to update, in real-time (or near real-time), a date/time format for the corresponding value in the input data. For example, in a case where a user inputs a date in the "MM/DD/YYYY" format for a data object, the transformation UI 206 may update the date for the corresponding value to the inputted date format.

As briefly described above, the transformation platform 202 may enable a user to define, via the transformation UI 206, virtual fields for a transformation output. In various embodiments, "Virtual" in the transformation objects table 206d may identify a representation (e.g., a JSON representation or the like) of a virtual field value for a data object. In some embodiments, the transformation UI 206 may display a truncated version of a virtual field value (e.g., truncated to the 100 characters, 50 characters, and/or the like), appended with an ellipsis (" . . . ") at the end. In certain embodiments, the transformation UI 206 may, based upon a user interaction with (e.g., via a hover action, a mouseover action, or the like) a virtual field value, present (e.g., in a pop-up window, a tooltip window, or the like) the full, properly-formatted virtual field value (e.g., a full, properly-formatted JSON representation or the like). In various embodiments, the transformation UI 206 may present an option (e.g., an add virtual button 207v or the like) to enable a user to define virtual field(s) as needed. For example, as described in more detail below, the transformation UI 206 may, based upon a user selection of the add virtual button 207v, cause a virtual fields interface or modal 207w (e.g., a pop-up window or the like) to be presented.

The "Hide" column in the transformation objects table 206d may include user selectable options (e.g., toggles) for hiding data entries in a transformation output (e.g., JSON entries in output JSON or the like). In various embodiments, hiding an element may ensure that the element will not be generated in a transformation (e.g., in a final transformation output result). In various embodiments, a corresponding input data entry may nevertheless be retained in a transformation output, even in a case where "Hide" is selected.

The "Remove" column in the transformation objects table 206d may include user selectable options (e.g., delete or "X" buttons or the like) for deleting data objects. In various embodiments, the transformation platform 202 may, based upon a user selection to delete a data object (and, optionally, based upon further confirmation by the user to delete the data object), cause the data object to become deleted from the transformation configuration data.

As shown in FIG. 2A, the transformation objects table 206d may include a user selectable option 207n for adding a new data object (e.g., a new App Field Type entry or the like). The transformation platform 202 may, based upon a user selection of option 207n, append a new value to a transformation output, and may cause the transformation UI 206 to present/append a corresponding new row in the transformation objects table 206d to permit a user to enter key value pair information (e.g., input name, output name, data type, value, etc.) for the new data object.

As briefly described above, the transformation objects table 206d may include a user selectable, add virtual option 207v that enables a user to define new virtual field(s). As depicted in FIG. 2A, the transformation platform 202 may, based upon user selection of the add virtual option 207v, cause the transformation UI 206 to present the virtual fields interface 207w. In various embodiments, the virtual fields interface 207w may provide a window or tab for each input data feed. In some embodiments, the virtual fields interface 207w may include a first portion that presents a virtual fields table 208t, a second portion 208p for template creation/management, and/or a third portion that presents user selectable options, such as an add new option 208n, an add formula option 208f, an add regular expression (RE) option 208r, a save virtual fields option 208s, and a cancel option 208c.

Selection of the add new option 208n may allow a user to enter, or otherwise, create, a new virtual field. In various embodiments, the transformation platform 202 may, based upon a user selection to create a new virtual field, cause the transformation UI 206 to present a tree structure identifying keys that have been identified in the input data. In various embodiments, the transformation platform 202 may, based upon a user selection of one of the keys in the tree structure, cause the transformation UI 206 to populate a column in the virtual fields table 208t with the value of the key in the input data. In certain embodiments, a user may also select a data type for a virtual field.

The transformation platform 202 may, based upon selection of the add formula option 208f, cause the transformation UI 206 to present a formula input box that allows a user to provide custom logic, or formula(s), to be implemented or executed for one or more values of one or more keys. For example, the transformation platform 202 may, based upon the provided custom logic (e.g., upon a user tabbing out of the formula input box) for a particular value of a key, process the value using the formula, and cause the transformation UI 206 to populate a column in the virtual fields interface 207w (e.g., an "Instance" column) with a result of the calculation (an example of virtual field selection and formula creation is shown in FIG. 2F). In a case where no result is produced, that column may remain blank or empty.

Selection of the add RE option 208r may allow the user to define a regular expression (or label). This may include user selection of an attribute on which to the regular expression is based. Regular expressions may be used to combine existing fields or keys of different data objects. For example, in a case where there is an existing "FirstName" field and an existing "LastName" field in input data, and a user desires to create a virtual field (e.g., "FirstNameLastName") that combines the two existing fields, the user may define a regular expression to effect such a combination. It is to be appreciated and understood that regular expressions may allow a user to create any suitable output field that does not exist in input data.

In some embodiments, inputting an arrow notation (e.g., "-->" or the like) may allow for a substitution to be performed after a regular expression is matched. For example, inputting "[A-Za-z]-->X" may match all uppercase and lowercase letters, and may replace the matched characters with an "X." In certain embodiments, matched groups may also be provided. For example, applying a regular expression, such as "(.+)@(.+)-->$1," to a value such as an e-mail address—e.g., john@email.com—may yield two groups, namely "john" and "email.com." Continuing the example, the dollar sign ($) and '1' (e.g., 1 index) may represent the first match group, and may produce all text prior to the "at" symbol ("@")—i.e., "john."

In various embodiments, in a case where a user identifies multiple source data feeds (e.g., in reference number 215 described above), the transformation platform 202 may be capable of merging of the multiple source data feeds to provide a single transformation output. In some embodiments, the transformation platform 202 may enable different fields from the different source data feeds to be combined via regular expressions. For example, a user may select one or more fields from each of multiple source data feeds, and define a regular expression to create a new key value mapping based on the selected fields.

In various embodiments, the virtual fields interface 207w may enable a user to create a template. In some embodiments, the transformation platform 202 may, based upon user selection of an index in the virtual fields table 208t (e.g., ${0} or the like), cause the transformation UI 206 to insert the selected index into an output area in the template portion 208p of the virtual fields interface 207w. In certain embodiments, the transformation platform 202 may cause the transformation UI 206 to present a result (after real values are substituted, for example, either from the input data or as a result of calculations performed against the above-described regular expression or label) in the "Instance" column of the virtual fields interface 207w.

Selection of the save virtual fields option 208s may confirm the user's configuration of virtual fields, and may cause the transformation platform 202 to save the newly-created virtual fields and/or template. Selection of the cancel option 208c may cancel the operations. In various embodiments, selection of either the save virtual fields option 208s or the cancel option 208c may cause the virtual fields interface 207w to close.

In exemplary embodiments, user interaction with some or all of the various elements presented in the transformation objects table 206d and/or the virtual fields interface 207w may cause the transformation platform 202 to perform various actions in real-time (or near real-time), including modifying transformation configuration data, performing a transformation to derive a transformation output (or update a transformation output) based on the modified transformation configuration data, and causing the transformation UI 206 to present a portion or an entirety of the transformation output in the output data display 206b.

As shown by reference numbers 235 and 240, the user may make selections or define mappings for the transformation of the input data and/or source data feed(s) (235), and the transformation platform 202 may detect (240) such user selections or defined mappings. For example, the transformation platform 202 may detect user selections or defined mappings based on the user's interaction with the transformation objects table 206d, as described above. In various embodiments, the detected user selections or defined mappings may include any labels or regular expressions for new virtual field(s) to be created in the transformation.

As shown by reference number 245, the transformation platform 202 may update (or modify) transformation configuration data based on the detected user selections or defined mappings. In various embodiments, the transformation platform 202 may update the transformation configuration data by creating and/or updating defined mappings (e.g., key value field mappings relating to input/source field names, output/target field names, labels or regular expressions to be applied, data types for fields (including for virtual fields), and/or the like). As shown by reference number 245a, the transformation platform 202 may perform a transformation of the input data, based on the updated transformation configuration data, to derive a transformation output. In various embodiments, and as shown by reference number 245b, the transformation platform 202 may store the updated/modified transformation configuration data in the transformation data structure 202d. As shown by reference numbers 250 and 250a, the transformation platform 202 may cause the transformation UI 206 to present the transformation output in the output data display 206b.

This provides a user with a preview of the transformation, which may allow the user to determine whether any changes need to be made to the defined mappings, virtual fields, etc. In various embodiments, the transformation platform 202 may perform some or all of the steps described above with respect to reference numbers 240, 245, 245a, 245b, 250, 250a in real-time (or near real-time) based upon user selections or defined mappings being made via the transformation UI 206. This enables a user to visualize a transformation output while the user is making selections or defining mappings, which can further aid the user in arriving at a suitable transformation configuration.

As shown by reference number 255, the user may save the transformation configuration settings. For example, the user may select the save option 207s to save the transformation configuration settings. In various embodiments, the transformation platform 202 may require that the user to enter a transformation ID (e.g., a service name or the like) and/or a layout name (e.g., a feed name or the like) in order for the configuration settings to be saved. In a case where a layout name (e.g., the feed name or the like) is blank, the transformation platform 202 may apply the transformation ID as the layout name by default (e.g., based upon user selection of the save option 207s).

As shown by reference number 260, the transformation platform 202 may provide the transformation output (and/or the transformation configuration data) to a target, downstream system (e.g., application, service, and/or the like). In this way, system(s) downstream may seamlessly obtain data that is properly-formatted or transformed for use by the system(s). In various embodiments, a user may (e.g., as part of identifying a source data feed(s) as described above with respect to reference number 215), identify or provide target system or service connection information (e.g., API information and/or the like) to the transformation platform 202. In such a case, the transformation platform 202 may store and use some or all of this information to establish communication sessions or connections to provide transformation outputs (and/or transformation configuration data) to the specified target, downstream system(s) (e.g., whether in a push- or pull-based manner).

In various embodiments, the transformation platform 202 may provide, via the transformation UI 206, a user selectable option to "reload servers" so as to notify one or more downstream systems that there is a new transformation configuration available, that a transformation configuration has been modified, or otherwise initiate communications with the downstream system(s) to initiate communications for receiving transformation output(s) or transformation configuration data. In certain embodiments, in a case where an existing transformation configuration is in a process of being updated or modified (e.g., by a user), downstream system(s) may continue to utilize the existing transformation configuration until, for example, the "reload servers" option is selected.

In certain embodiments, the transformation UI 206 may not include the load option 207a described above, or may not require user selection of the load option 207a to cause the output data display 206b to be presented/updated and/or the transformation objects table 206d to become populated/updated/un-flattened. In such embodiments, the transformation platform 202 may dynamically cause, in real-time (or near real-time), the transformation UI 206 to present/update transformation output(s) in the output data display 206b and/or to populate/update/un-flatten the transformation objects table 206d based on input data being (e.g., while input data is being) entered into the input data interface 206a.

Figure 2B:
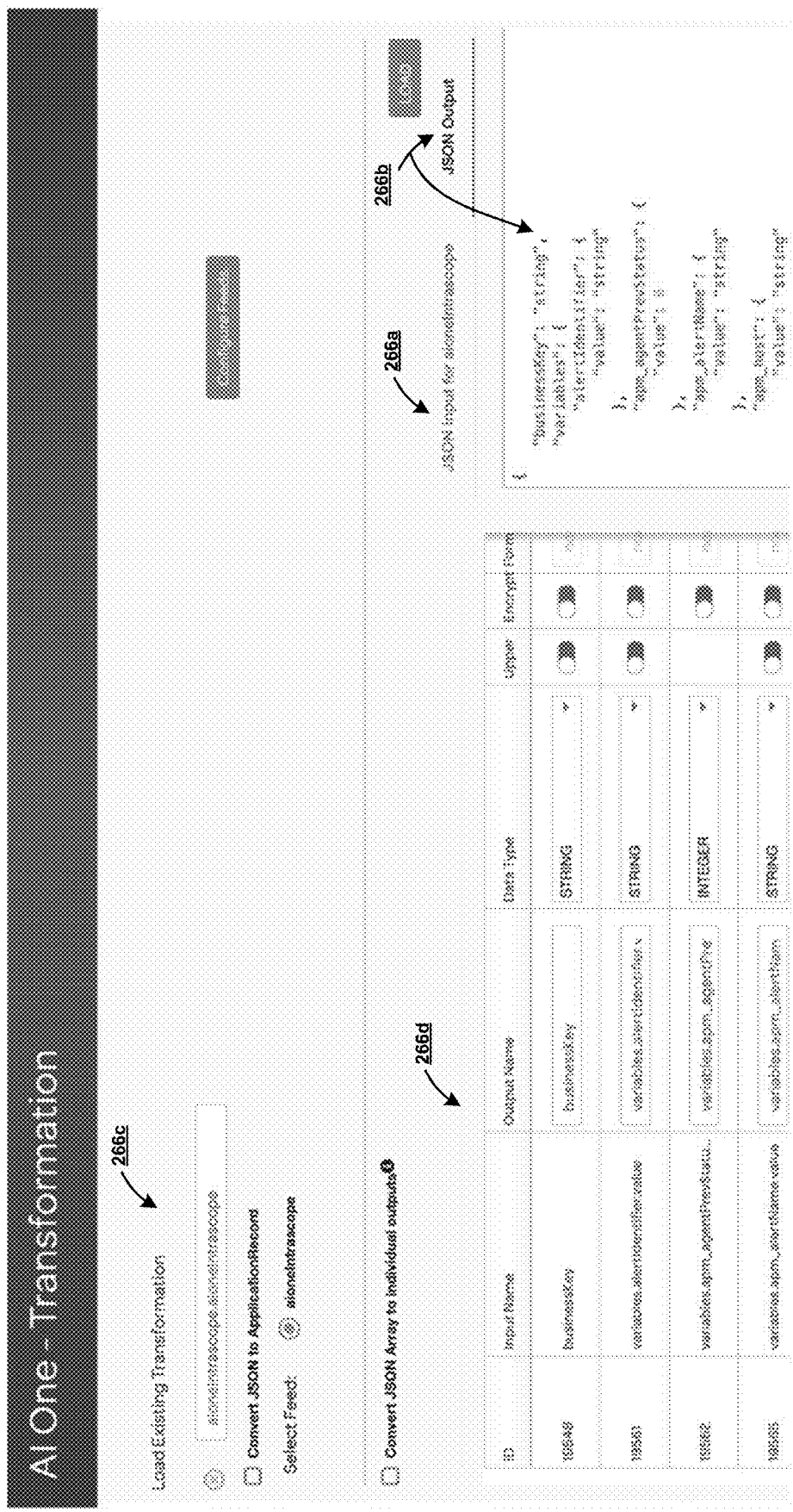
Figure 2C:
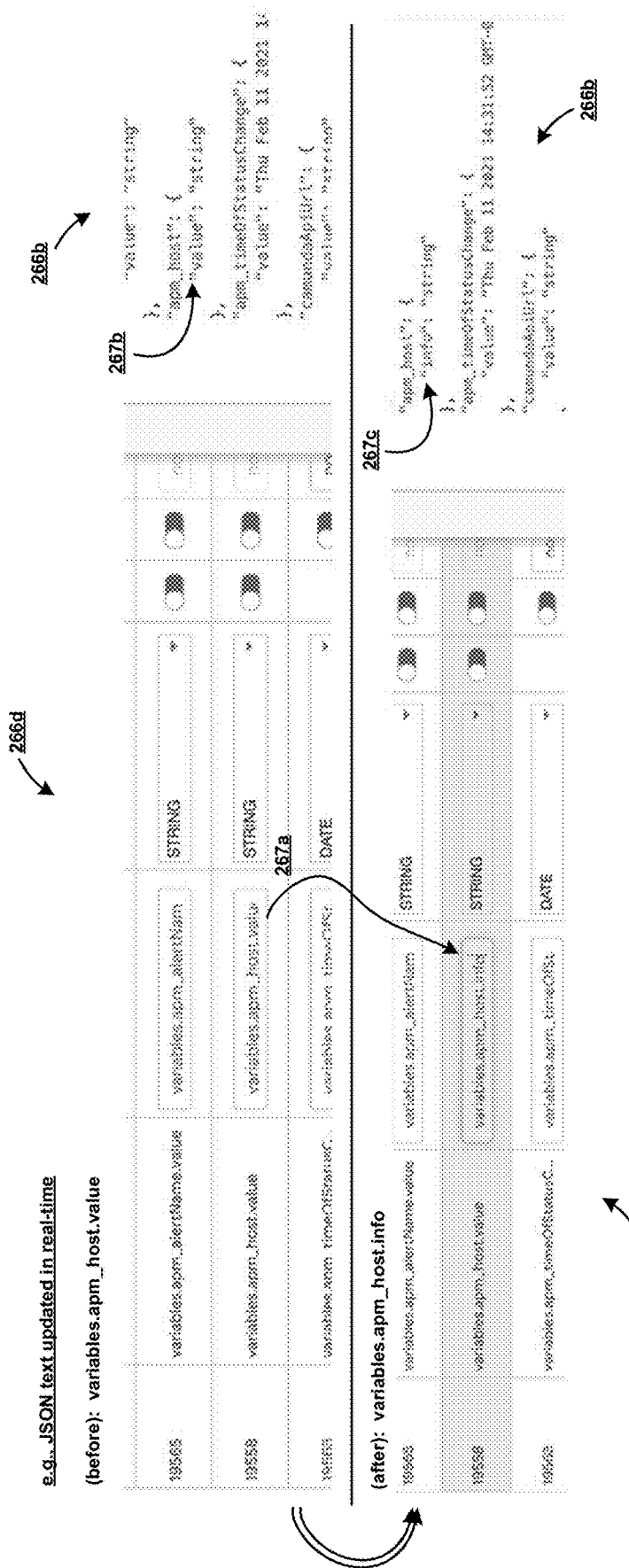
Figure 2D:
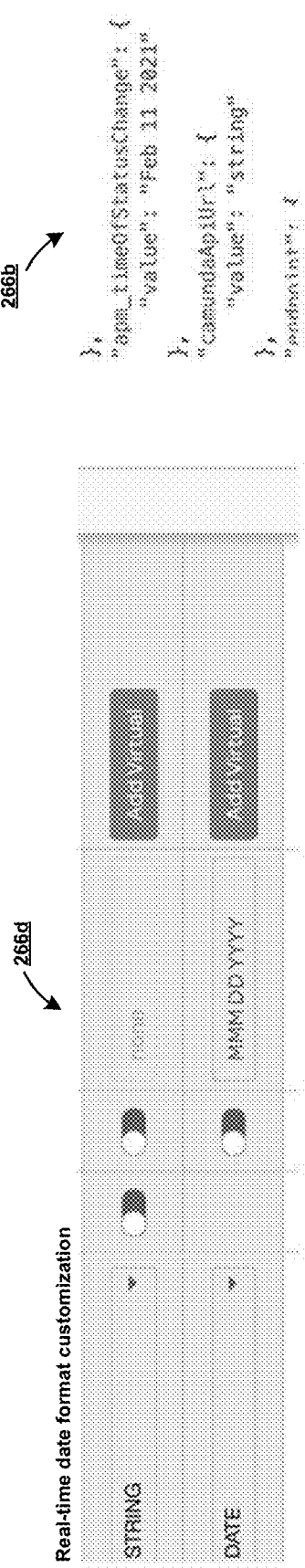
Figure 2E:
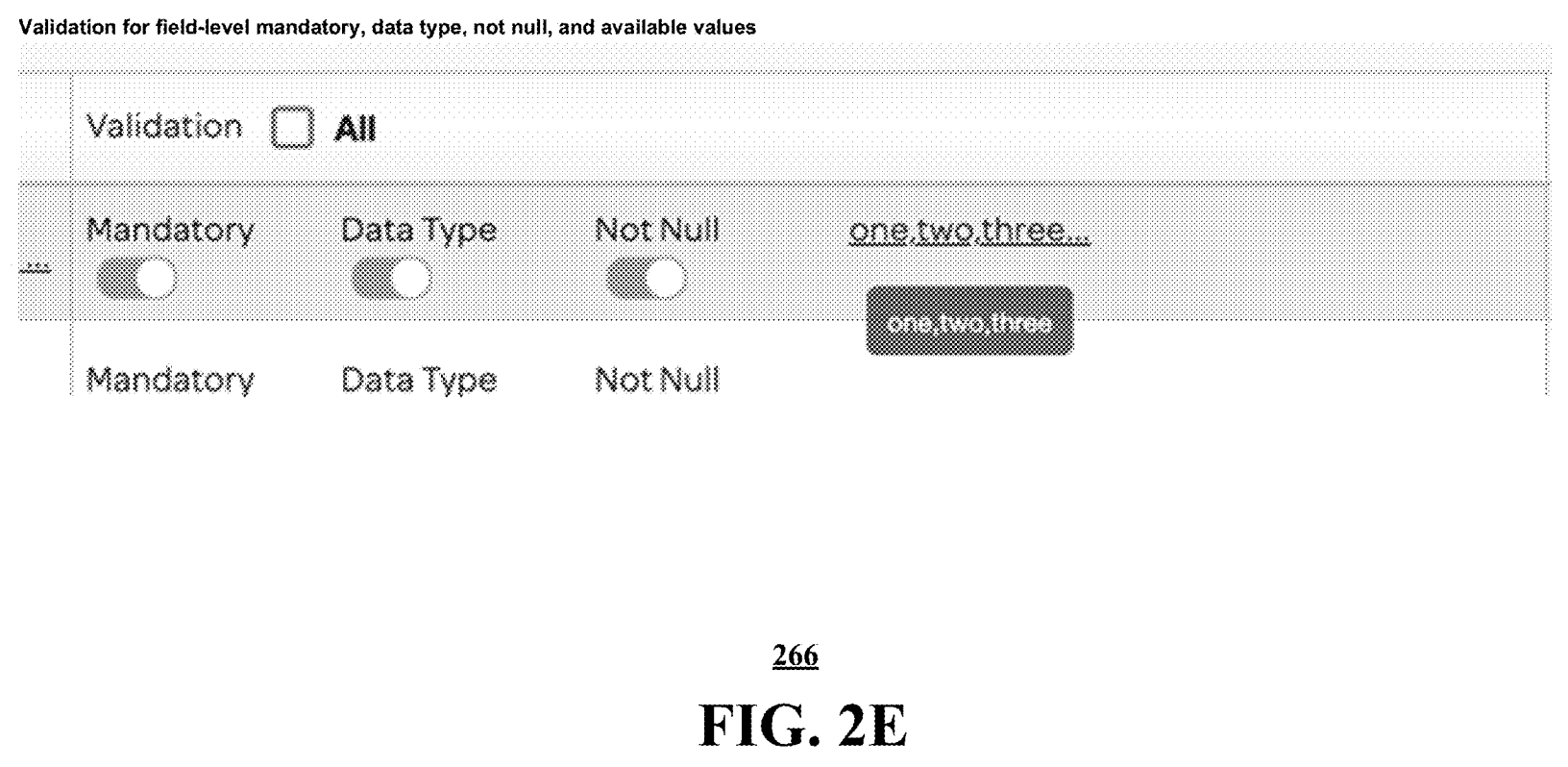
Figure 2F:
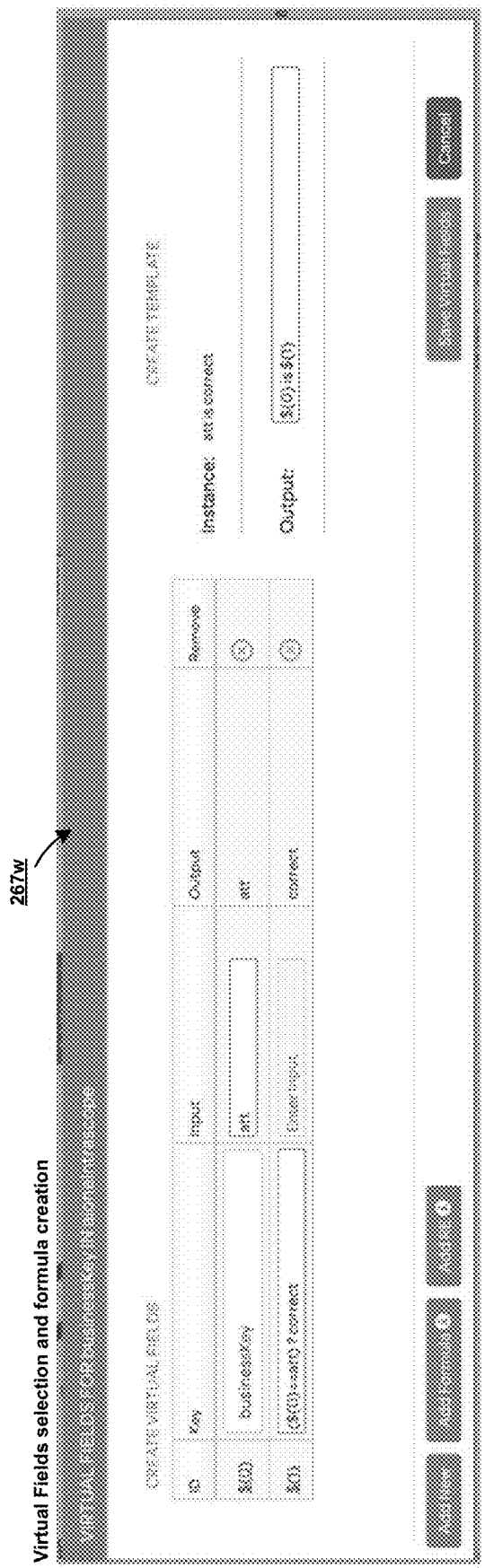

FIGS. 2B-2F are diagrams illustrating example, non-limiting embodiments of a transformation UI 266 functioning in, or in conjunction with, the communications network of FIG. 1 and/or the system of FIG. 2A in accordance with various aspects described herein. The transformation UI 266 (different portions of which are depicted in FIGS. 2B-2F) may be the same as, or similar to, the transformation UI 206 of FIG. 2A. For example, the transformation UI 266 be provided by a transformation platform, such as the transformation platform 202 or the like. As shown in FIG. 2B, the transformation UI 266 may include an input data interface 266a, an output data display 266b, a load existing transformation interface 266c, and a transformation objects table 266d (e.g., with example flattened JSON-based data). The transformation UI 266 may enable a user to input data to be transformed, identify/select source data feed(s), define mappings for transformations, define virtual fields, preview transformation outputs, and/or the like similar to that described above with respect to the transformation UI 206 of FIG. 2A.

FIG. 2C depicts a real-time transition or update of the transformation objects table 266d and the output data display 266b, based upon a user selection or defined mapping in the transformation objects table 266d—e.g., a modification of an output name (of a data object) from "variables.apm_ahost.value" to "variables.apm_host.info" (shown by reference number 267a) and a reflection or preview of that modification in the output data display 266b (as shown by reference numbers 267b and 267c).

As depicted in FIGS. 2D and 2E, the transformation UI 266 may enable customization of a date format in real-time (or near real-time) (FIG. 2D), and may enable customization of validation checks (e.g., field-level mandatory, field-level data type, field level null or not null, field-level available values, etc.) to be performed by the transformation platform (e.g., the transformation platform 202) and/or the transformation UI 266 (FIG. 2E)—e.g., to check for validity of input data, such as described above with respect to the transformation UI 206 of FIG. 2A. As depicted in FIG. 2F, the transformation UI 266 may provide a virtual fields interface 267w, which may be the same as or similar to the virtual fields interface 207w of FIG. 2A. In various embodiments, the virtual fields interface 267w may enable a user to define regular expressions or formulas to derive new fields based on existing fields in input data.

It is to be understood and appreciated that, some or all of the aspects and/or functionalities of the system 200 may apply to, be included in, or be provided by the transformation UI 266. For example, some or all of the aspects and/or functionalities of the transformation UI 206 (and/or the transformation platform 202), described above with respect to FIG. 2A, may apply to, be included in, or be provided by the transformation UI 266.

It is also to be understood and appreciated that the quantity and arrangement of transformation platforms, interfaces, transformation data structures, networks, and computing devices shown in FIGS. 2A-2F are provided as examples. In practice, there may be additional transformation platforms, interfaces, transformation data structures, networks, or computing devices, fewer transformation platforms, interfaces, transformation data structures, networks, or computing devices, or differently arranged transformation platforms, interfaces, transformation data structures, networks, or computing devices than those shown in FIGS. 2A-2F. For example, the system 200 can include more or fewer transformation platforms, interfaces, transformation data structures, networks, or computing devices, etc. Furthermore, two or more transformation platforms, interfaces, transformation data structures, networks, or computing devices shown in one or more of FIGS. 2A-2F may be implemented within a single transformation platform, interface, transformation data structure, network, or computing device, or a single transformation platform, interface, transformation data structure, network, or computing device shown in one or more of FIGS. 2A-2F may be implemented as multiple, distributed transformation platforms, interfaces, transformation data structures, networks, or computing devices. Additionally, or alternatively, a set of transformation platforms, interfaces, transformation data structures, networks, or computing devices (e.g., one or more transformation platforms, interfaces, transformation data structures, networks, or computing devices) of the system 200 may perform one or more functions described as being performed by another set of transformation platforms, interfaces, transformation data structures, networks, or computing devices of the system 200.

Figure 2G:
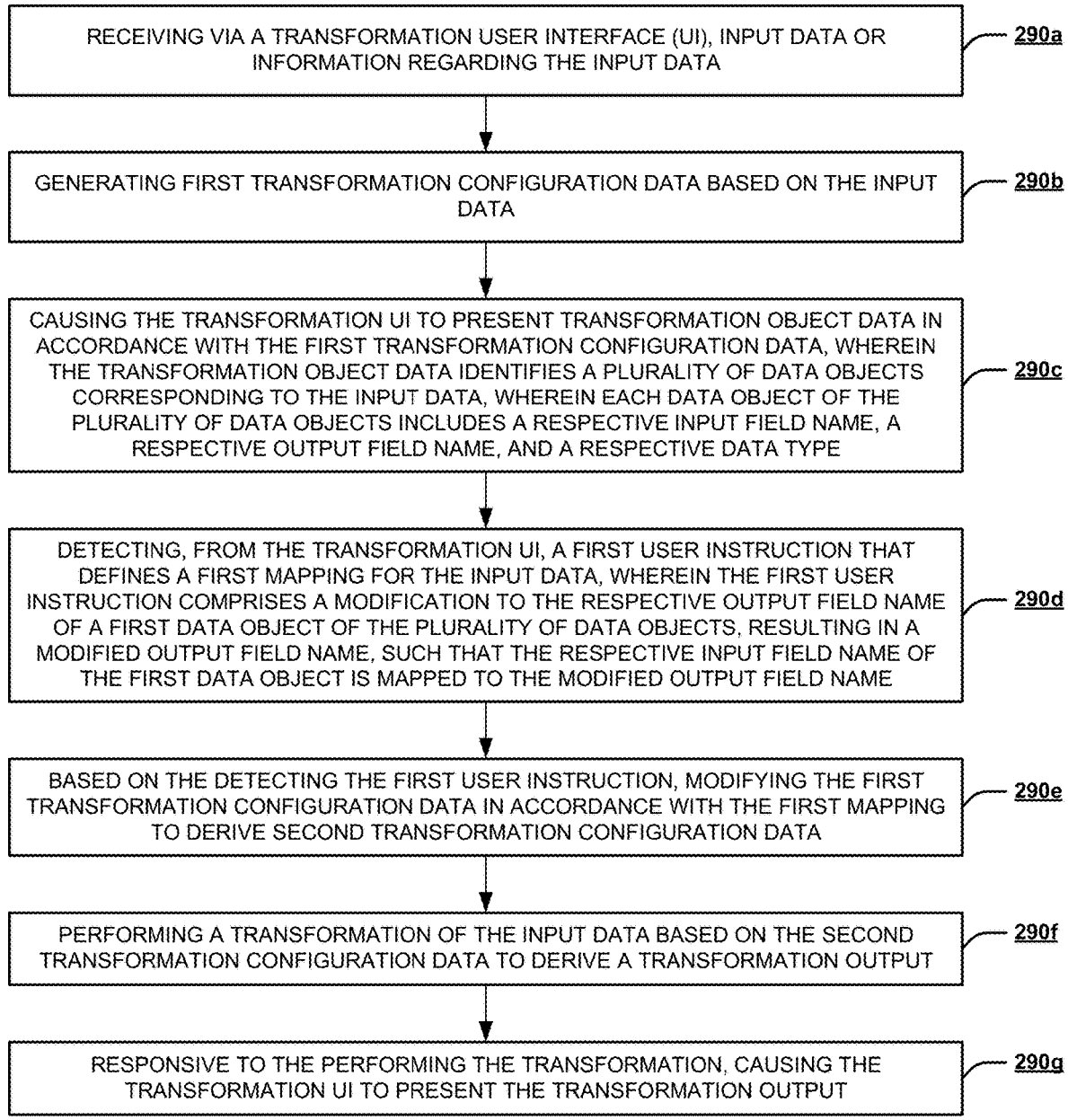
FIG. 2G depicts an illustrative embodiment of a method in accordance with various aspects described herein.

FIG. 2G depicts an illustrative embodiment of a method 290 in accordance with various aspects described herein. In some embodiments, one or more process blocks of FIG. 2G can be performed by a transformation platform and/or a transformation UI, such as the transformation platform 202, the transformation UI 206, and/or the transformation UI 266. In some embodiments, one or more process blocks of FIG. 2G may be performed by another device or a group of devices separate from or including the transformation platform 202, the transformation UI 206, and/or the transformation UI 266, such as the computing device 204 and/or the network 275.

At 290a, the method can include receiving, via a transformation user interface (UI), input data or information regarding the input data. For example, the transformation platform 202 can receive, via the transformation UI 206 or 266, input data or information regarding the input data in a manner similar to that described above with respect to the system 200 of FIG. 2A.

At 290b, the method can include generating first transformation configuration data based on the input data. For example, the transformation platform 202 can generate first transformation configuration data based on the input data in a manner similar to that described above with respect to the system 200 of FIG. 2A.

At 290c, the method can include causing the transformation UI to present transformation object data in accordance with the first transformation configuration data, wherein the transformation object data identifies a plurality of data objects corresponding to the input data, wherein each data object of the plurality of data objects includes a respective input field name, a respective output field name, and a respective data type. For example, the transformation platform 202 can cause the transformation UI 206 or 266 to present transformation object data in accordance with the first transformation configuration data in a manner similar to that described above with respect to the system 200 of FIG. 2A, where the transformation object data identifies a plurality of data objects corresponding to the input data, and where each data object of the plurality of data objects includes a respective input field name, a respective output field name, and a respective data type.

At 290d, the method can include detecting, from the transformation UI, a first user instruction that defines a first mapping for the input data, wherein the first user instruction comprises a modification to the respective output field name of a first data object of the plurality of data, resulting in a modified output field name, such that the respective input field name of the first data object is mapped to the modified output field name. For example, the transformation platform 202 can detect, from the transformation UI 206 or 266, a first user instruction that defines a first mapping for the input data in a manner similar to that described above with respect to the system 200 of FIG. 2A, where the first user instruction comprises a modification to the respective output field name of a first data object of the plurality of data, resulting in a modified output field name, such that the respective input field name of the first data object is mapped to the modified output field name.

At 290e, the method can include, based on the detecting the first user instruction, modifying the first transformation configuration data in accordance with the first mapping to derive second transformation configuration data. For example, the transformation platform 202 can, based on the detecting the first user instruction, modify the first transformation configuration data in accordance with the first mapping to derive second transformation configuration data in a manner similar to that described above with respect to the system 200 of FIG. 2A.

At 290f, the method can include performing a transformation of the input data based on the second transformation configuration data to derive a transformation output. For example, the transformation platform 202 can perform a transformation of the input data based on the second transformation configuration data to derive a transformation output in a manner similar to that described above with respect to the system 200 of FIG. 2A.

At 290g, the method can include, responsive to the performing the transformation, cause the transformation UI to present the transformation output. For example, the transformation platform 202 can, responsive to the performing the transformation, cause the transformation UI to present the transformation output in a manner similar to that described above with respect to the system 200 of FIG. 2A.

In various embodiments, the information regarding the input data may include an identification of a source from which the input data can be obtained. In some embodiments, the transformation platform may obtain the input data from the source based on the identification.

In certain embodiments, the input data may be in a JavaScript Object Notation (JSON) format, an extensible Markup Language (XML) format, a comma-separated value (CSV) format, or a flat-file format.

In an embodiment, the causing the transformation UI to present the transformation object data may include causing the transformation UI to present the transformation object data in a transformation objects table, where the first user instruction may include an adjustment to the transformation objects table.

In one embodiment, the generating the first transformation configuration data may include identifying, for each data object of the plurality of data objects, the respective input field name for the data object, the respective output field name for the data object, and the respective data type for the data object.

In various embodiments, the transformation platform may store the second transformation configuration data in a transformation data structure.

In some embodiments, the modifying the first transformation configuration data, the performing the transformation of the input data, and the causing the transformation UI to present the transformation output may be performed in real-time based on the detecting the first user instruction.

In certain embodiments, the transformation platform may detect, from the transformation UI, a second user instruction to create a virtual field to be included in the transformation output, where the second user instruction may include a regular expression relating to one or more of the respective input field names.

In one or more embodiments, the transformation platform may receive, via the transformation UI, information relating to a target system, and may transmit, to the target system, one or more transformation outputs produced based on the second transformation configuration data.

In various embodiments, the transformation platform may enable a computing device to access the transformation UI based on permissions associated with a user of the computing device.

While for purposes of simplicity of explanation, the respective processes are shown and described as a series of blocks in FIG. 2G, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Referring now to FIG. 3, a block diagram 300 is shown illustrating an example, non-limiting embodiment of a virtualized communications network in accordance with various aspects described herein. In particular, a virtualized communications network is presented that can be used to implement some or all of the subsystems and functions of system 100, the subsystems and functions of system 200, transformation UI 266, and method 290 presented in FIGS. 1 and 2A-2G. For example, virtualized communications network 300 can facilitate, in whole or in part, defining of transformation configuration data and providing of real-time (or near real-time) transformation of input data/source data feed(s) based on the transformation configuration data.

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements-which are typically integrated to perform a single function, the virtualized communications network employs virtual network elements (VNEs) 330, 332, 334, etc. that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general purpose processors or general purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 330 composed of NFV software modules, merchant silicon, and associated controllers. The software can be written so that increasing workload consumes incremental resources from a common resource pool, and moreover so that it's elastic: so the resources are only consumed when needed. In a similar fashion, other network elements such as other routers, switches, edge caches, and middle-boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized, and might require special DSP code and analog front-ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc. to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements don't typically need to forward large amounts of traffic, their workload can be distributed across a number of servers—each of which adds a portion of the capability, and overall which creates an elastic function with higher availability than its former monolithic version. These virtual network elements 330, 332, 334, etc. can be instantiated and managed using an orchestration approach similar to those used in cloud compute services.

The cloud computing environments 375 can interface with the virtualized network function cloud 325 via APIs that expose functional capabilities of the VNEs 330, 332, 334, etc. to provide the flexible and expanded capabilities to the virtualized network function cloud 325. In particular, network workloads may have applications distributed across the virtualized network function cloud 325 and cloud computing environment 375 and in the commercial cloud, or might simply orchestrate workloads supported entirely in NFV infrastructure from these third party locations.

Figure 4:
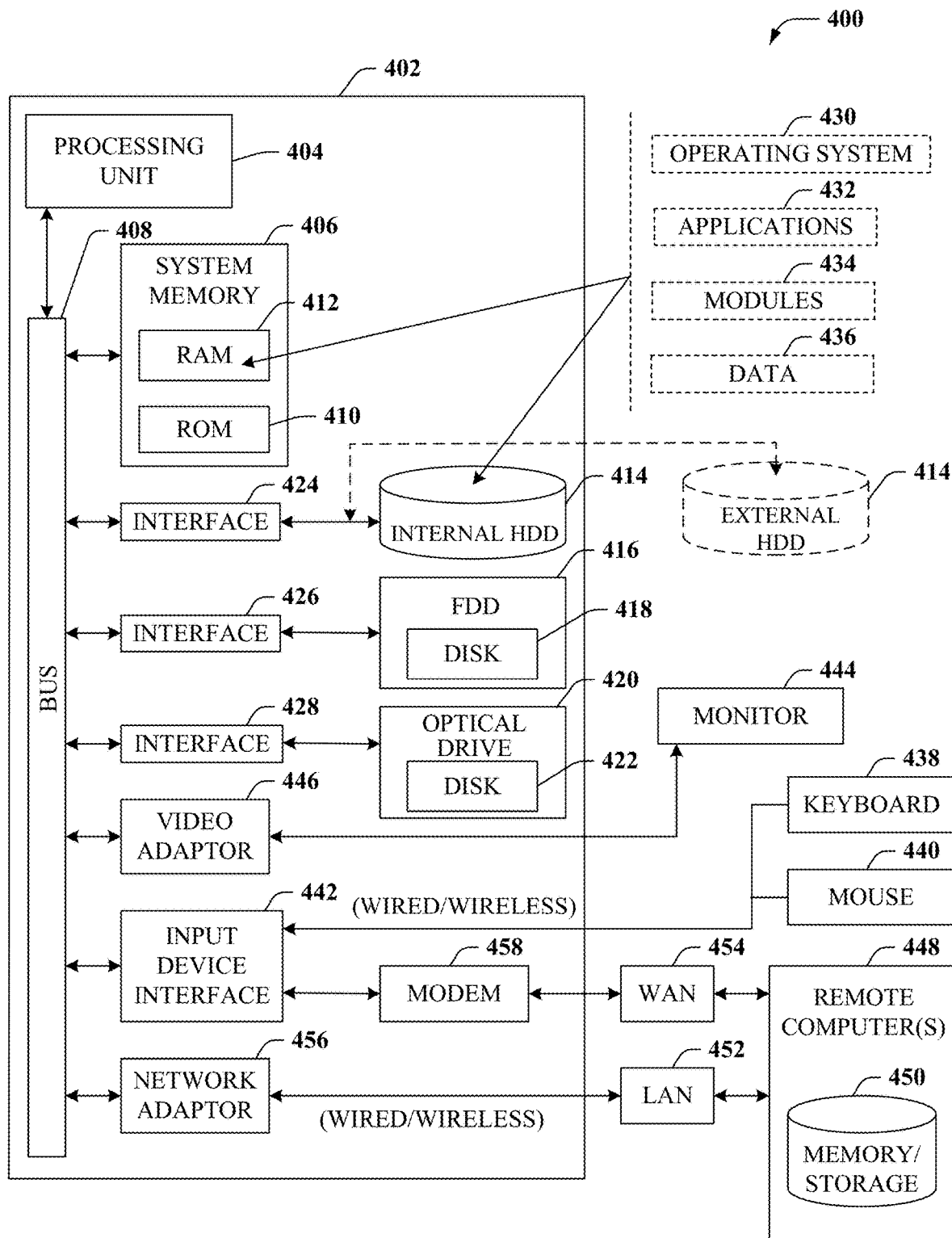
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or VNEs 330, 332, 334, etc. Each of these devices can be implemented via computer-executable instructions that can run on one or more computers, and/or in combination with other program modules and/or as a combination of hardware and software. For example, computing environment 400 can facilitate, in whole or in part, defining of transformation configuration data and providing of real-time (or near real-time) transformation of input data/source data feed(s) based on the transformation configuration data.

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communications network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 5:
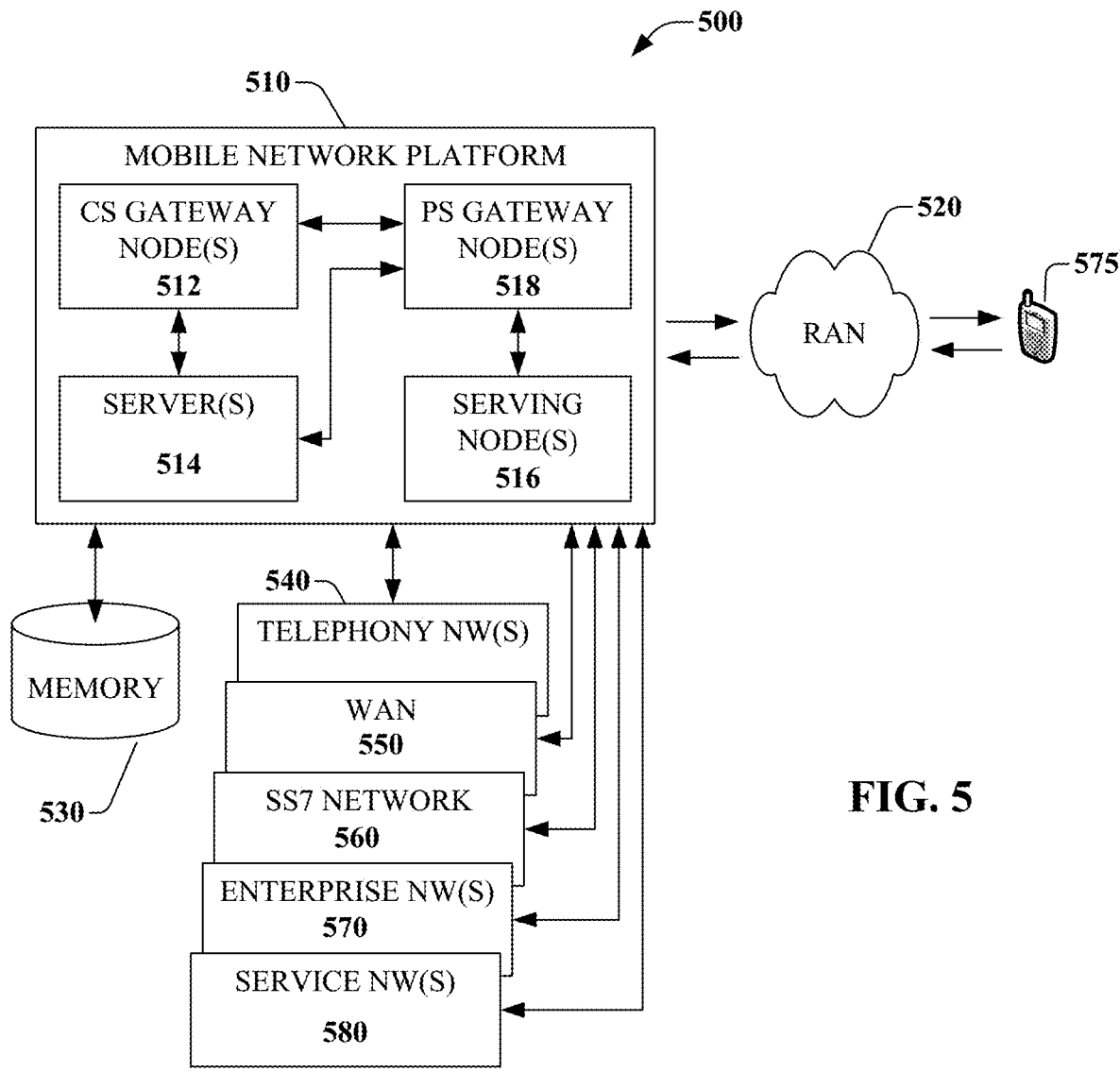
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, and/or VNEs 330, 332, 334, etc. For example, platform 510 can facilitate, in whole or in part, defining of transformation configuration data and providing of real-time (or near real-time) transformation of input data/source data feed(s) based on the transformation configuration data. In one or more embodiments, the mobile network platform 510 can generate and receive signals transmitted and received by base stations or access points such as base station or access point 122. Generally, mobile network platform 510 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks, and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technology(ies) utilized by mobile network platform 510 for telecommunication over a radio access network 520 with other devices, such as a radiotelephone 575.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 570 can embody, at least in part, a service network(s) like IP multimedia subsystem (IMS). Based on radio technology layer(s) available in technology resource(s) or radio access network 520, PS gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to mobile network platform 510 (e.g., deployed and operated by the same service provider), such as distributed antennas networks that enhance wireless service coverage by providing more network coverage.

It is to be noted that server(s) 514 can comprise one or more processors configured to confer at least in part the functionality of mobile network platform 510. To that end, the one or more processor can execute code instructions stored in memory 530, for example. It is should be appreciated that server(s) 514 can comprise a content manager, which operates in substantially the same manner as described hereinbefore.

In example embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

Figure 6:
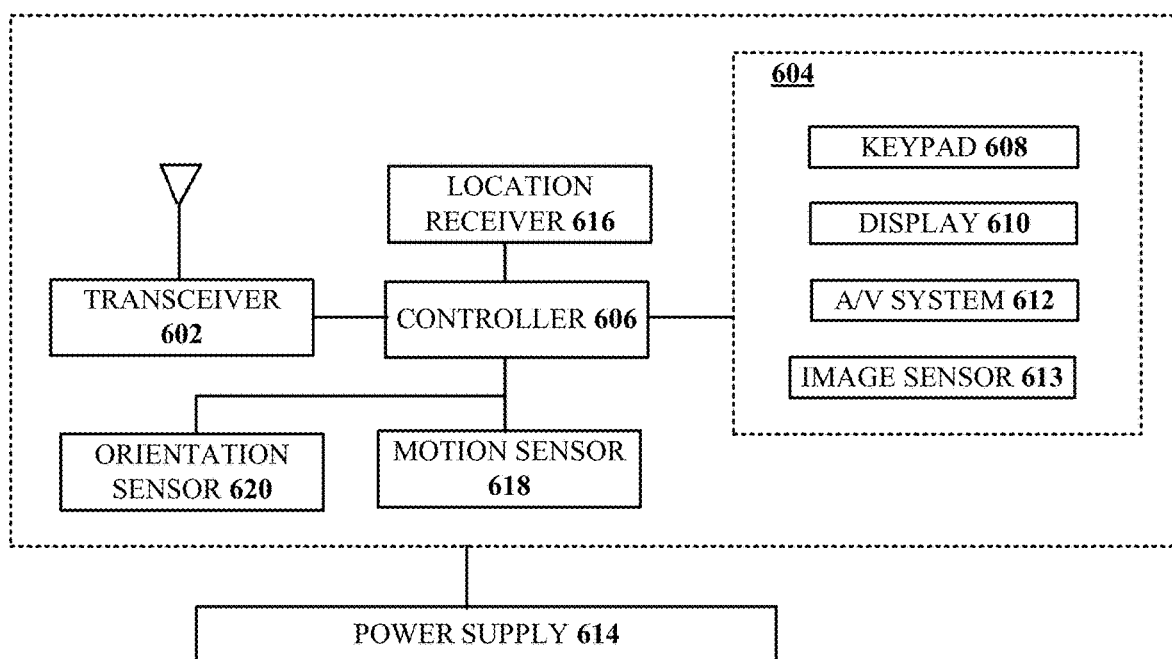
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via either communications network 125. For example, computing device 600 can facilitate, in whole or in part, defining of transformation configuration data and providing of real-time (or near real-time) transformation of input data/source data feed(s) based on the transformation configuration data.

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VOIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, non-volatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communications network) can employ various AI-based schemes for carrying out various embodiments thereof. Moreover, the classifier can be employed to determine a ranking or priority of each cell site of the acquired network. A classifier is a function that maps an input attribute vector, $x=(x1, x2, x3, x4, \ldots, xn)$, to a confidence that the input belongs to a class, that is, $f(x)$ =confidence (class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communications network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," "data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A device, comprising:
a processing system including a processor; and
a memory that stores executable instructions that, when executed by the processing system, facilitate performance of operations, the operations comprising:
receiving, via a transformation user interface (UI), input data or information regarding the input data;
generating first transformation configuration data based on the input data or the information;
causing the transformation UI to present transformation object data in accordance with the first transformation configuration data, wherein the transformation object data identifies a plurality of data objects corresponding to the input data, and wherein the causing the transformation UI to present the transformation object data comprises causing the transformation UI to present the transformation object data in a transformation objects table and causing the transformation UI to present an option for inputting of an expression for name standardization;
detecting, from the transformation UI, a first user selection of the option and a user input of the expression for name standardization, wherein the expression for name standardization combines values of two or more name-related fields;
performing a transformation of the input data based on the detecting to derive a transformation output; and
responsive to the performing the transformation, causing the transformation UI to present the transformation output.

2. The device of claim 1, wherein the information regarding the input data comprises an identification of a source from which the input data can be obtained, and wherein the operations further comprise obtaining the input data from the source based on the identification.

3. The device of claim 1, wherein the input data is in a JavaScript Object Notation (JSON) format, an extensible Markup Language (XML) format, a comma-separated value (CSV) format, or a flat-file format.

4. The device of claim 1, wherein the generating the first transformation configuration data comprises identifying, for each data object of the plurality of data objects, a respective input field name for that data object, a respective output field name for that data object, and a respective data type for that data object.

5. The device of claim 4, wherein the operations further comprise detecting, from the transformation UI, a first user instruction that defines a first mapping for the input data, and wherein the first user instruction comprises a modification to a respective output field name of a first data object of the plurality of data objects, resulting in a modified output field name, such that a respective input field name of the first data object is mapped to the modified output field name.

6. The device of claim 5, wherein the operations further comprise, based on the detecting the first user instruction, modifying the first transformation configuration data in accordance with the first mapping to derive second transformation configuration data, and storing the second transformation configuration data in a transformation data structure.

7. The device of claim 1, wherein the performing the transformation of the input data and the causing the transformation UI to present the transformation output are performed in real-time based on user command.

8. The device of claim 1, wherein the operations further comprise receiving, via the transformation UI, information relating to a target system, and transmitting, to the target system, one or more transformation outputs produced based on second transformation configuration data.

9. The device of claim 1, wherein the operations further comprise enabling a computing device to access the transformation UI based on permissions associated with a user of the computing device.

10. A non-transitory machine-readable medium, comprising executable instructions that, when executed by a processing system including a processor, facilitate performance of operations, the operations comprising:
obtaining input data from a transformation user interface (UI);
deriving transformation configuration data based on the input data;
causing the transformation UI to present transformation object data in accordance with the transformation configuration data, wherein the transformation object data identifies a data object of a plurality of data objects corresponding to the input data, and wherein the causing the transformation UI to present the transformation object data comprises causing the transformation UI to present the transformation object data in a transformation objects table and causing the transformation UI to present an option for inputting of an expression for address normalization;
detecting, from the transformation UI, a first user selection of the option and a user input of the expression for address normalization, wherein the expression for address normalization combines values of two or more address-related fields;
performing a transformation of the input data based on the detecting, resulting in a transformation output; and
responsive to the performing the transformation, providing the transformation output to a target system remote from the processing system.

11. The non-transitory machine-readable medium of claim 10, wherein each data object of the plurality of data objects includes a respective input field name, a respective output field name, and a respective data type, wherein the operations further comprise detecting, from the transformation UI, a first user instruction that defines a first mapping for the input data, and wherein the first user instruction comprises a modification to a respective output field name of a first data object of the plurality of data objects, resulting in a modified output field name, such that a respective input field name of the first data object is mapped to the modified output field name.

12. The non-transitory machine-readable medium of claim 10, wherein the input data is in a JavaScript Object Notation (JSON) format, an extensible Markup Language (XML) format, a comma-separated value (CSV) format, or a flat-file format.

13. The non-transitory machine-readable medium of claim 10, wherein the operations further comprise receiving, via the transformation UI, information relating to the target system, and wherein the providing the transformation output to the target system is in accordance with the information relating to the target system.

14. The non-transitory machine-readable medium of claim 10, wherein the expression for address normalization relates to e-mail addresses.

15. A method, comprising:
obtaining, by a processing system including a processor, a plurality of source data feeds over a network;
generating, by the processing system, first transformation configuration data based on the plurality of source data feeds;
causing, by the processing system, a transformation user interface (UI) to present transformation object data in accordance with the first transformation configuration data, wherein the transformation object data identifies a first data object corresponding to a first source data feed of the plurality of source data feeds, and a second data object corresponding to a second source data feed of the plurality of source data feeds, and wherein the causing the transformation UI to present the transformation object data comprises causing the transformation UI to present the transformation object data in a transformation objects table and causing the transformation UI to present an option for inputting of one or more expressions for name standardization, address normalization, or both;
detecting, by the processing system and from the transformation UI, a user selection of the option and user input of the one or more expressions, wherein the one or more expressions comprise one or both of (i) an expression for name standardization that combines values of two or more name-related fields and (ii) an expression for address normalization that combines values of two or more address-related fields;
performing, by the processing system, a transformation of the plurality of source data feeds based on the detecting to produce a transformation output; and
causing, by the processing system, the transformation UI to present the transformation output and transmitting, by the processing system, the transformation output to a target downstream system remote from the processing system.

16. The method of claim 15, wherein the one or more expressions for comprise an expression for name standardization that combines values of two or more name-related fields.

17. The method of claim 15, further comprising receiving, by the processing system and via the transformation UI, information relating to the target downstream system.

18. The method of claim 17, wherein the transmitting is in accordance with the information relating to the target downstream system.

19. The method of claim 15, wherein the one or more expressions comprise an expression for address normalization that combines values of two or more address-related fields.

20. The method of claim 19, wherein the expression for address normalization relates to e-mail addresses.

* * * * *